United States Patent
John et al.

(10) Patent No.: US 7,255,480 B2
(45) Date of Patent: Aug. 14, 2007

(54) DIAMOND BEARING WITH COOLING/LUBRICATION CHANNELS

(75) Inventors: Hendrik John, Celle (DE); Andreas Krafczyk, Celle (DE)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 11/299,565

(22) Filed: Dec. 12, 2005

(65) Prior Publication Data

US 2006/0140524 A1 Jun. 29, 2006

Related U.S. Application Data

(63) Continuation of application No. 10/397,482, filed on Mar. 26, 2003, now abandoned.

(51) Int. Cl.
*F16C 37/00* (2006.01)

(52) U.S. Cl. ...................... 384/303; 384/321
(58) Field of Classification Search ............... 384/303, 384/305, 313, 316, 317, 321
See application file for complete search history.

(56) References Cited

U.S. PATENT DOCUMENTS

| | | |
|---|---|---|
| 4,410,054 A | 10/1983 | Nagel et al. |
| 4,620,601 A | 11/1986 | Nagel |
| 4,789,251 A | 12/1988 | McPherson et al. |
| 5,253,939 A | 10/1993 | Hall |
| 5,368,398 A | 11/1994 | Damm et al. |
| 5,560,716 A | 10/1996 | Tank et al. |
| 6,190,050 B1 | 2/2001 | Campbell |

*Primary Examiner*—Lenard A. Footland
(74) *Attorney, Agent, or Firm*—Madan, Mossman, Sriram, P.C.

(57) ABSTRACT

A diamond bearing assembly comprises a support ring having at least one diamond bearing segment attached thereto. A plurality of bearing pads are disposed on the diamond bearing segment. The plurality of bearing pads have a plurality of flow micro-channels between the bearing pads. A flow channel is disposed in the support ring proximate the bearing segment, wherein the flow channel has a fluid flowing therethrough for cooling the bearing segment. In another aspect, a method of cooling a diamond bearing comprises disposing a plurality of bearing pads on a diamond bearing segment. The diamond bearing segment are attached to a support ring. A fluid flows through a substantially radial channel in the support ring to cool the diamond bearing segment.

6 Claims, 3 Drawing Sheets

DIAMOND BEARING WITH COOLING/LUBRICATION CHANNELS

CROSS REFERENCE TO RELATED APPLICATIONS

This application is a Continuation of U.S. patent application Ser. No. 10/397,482 filed on Mar. 26, 2003, now abandoned which is incorporated herein by reference.

BACKGROUND OF THE INVENTION

1. Field of the Invention

This invention relates to thrust bearings and more particularly to diamond bearing segments with cooling and lubrication channels.

2. Description of the Related Art

Diamond bearings have found application in oil drilling and other environments demanding high load carrying ability under extreme wear conditions. As used herein, the term diamond includes synthetic diamond such as polycrystalline diamond. When used as a thrust bearing, a pair of load carrying structures containing diamond pads, also called inserts, are arranged in opposition to bear against one another. One such common arrangement for a thrust bearing is shown in FIG. 1, where a load ring 1 has a number of individual diamond bearing inserts 2 disposed concentrically therein. The thrust load is carried by the bearing surface 3 of each insert.

The load carrying capacity of such a bearing is limited by the frictional heat build up in the diamond bearing inserts. The heat buildup is related to the unit area loading of the bearing insert and to the availability of cooling mechanisms to remove the heat generated. A thermal limit is eventually reached beyond which the inserts begin to degrade and ultimately may disintegrate. Replacement of any bearing in a downhole environment is undesirable due to the expense and downtime involved in pulling and repairing such equipment.

The methods and apparatus of the present invention overcome the foregoing disadvantages of the prior art by providing a novel bearing having an increased surface area for lowering the unit loading and integral flow channels for cooling the bearing.

SUMMARY OF THE INVENTION

The present invention contemplates a novel diamond bearing having an increased surface area for lowering the unit loading and integral flow channels for cooling the bearing. In one aspect of the invention, a diamond bearing assembly comprises a support ring having at least one diamond bearing segment attached thereto. A plurality of bearing pads are disposed on the diamond bearing segment. The plurality of bearing pads have a plurality of flow micro-channels between the bearing pads. A flow channel is disposed in the support ring proximate the bearing segment, wherein the flow channel has a fluid flowing therethrough for cooling the bearing segment.

In another aspect, a method of cooling a diamond bearing comprises disposing a plurality of bearing pads on a diamond bearing segment. The diamond bearing segment are attached to a support ring. A fluid flows through a substantially radial channel in the support ring to cool the diamond bearing segment.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
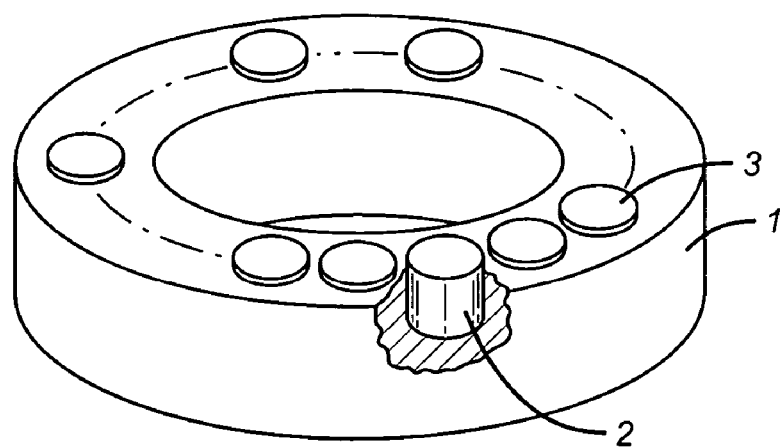
FIG. 1 is a schematic drawing showing a prior art diamond bearing.
Figure 2A:
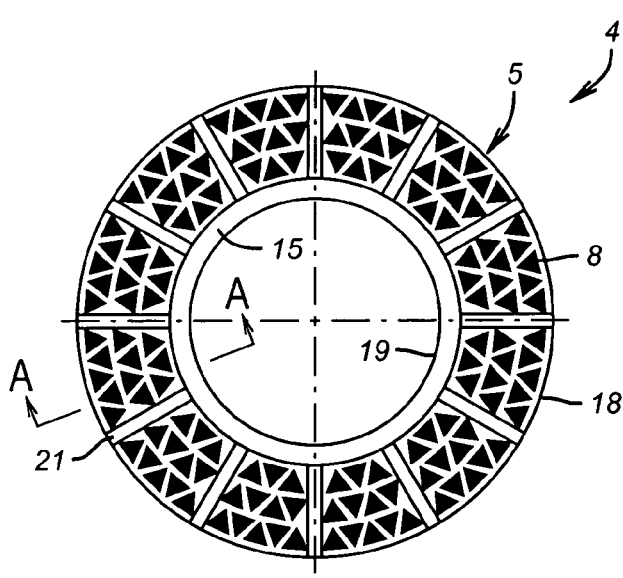
FIG. 2A is a schematic drawing of a diamond bearing assembly according to one preferred embodiment of the present invention.
Figure 2B:
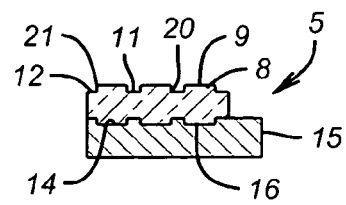
FIG. 2B is a cross section of a portion of a bearing assembly as depicted in FIG. 2A.

In one preferred embodiment, a diamond bearing assembly 4, FIG. 2A, has multiple bearing segments 5 attached to a bearing support ring 15, see FIG. 2B. A pattern of bearing pads 8 are disposed in the front surface 12 of the bearing segment 5 and each bearing pad 8 has an associated load surface 9. The bearing pads 8 are triangularly shaped such that the total area of all the load surfaces 9 of bearing assembly 4 is substantially greater than the corresponding load surface area of the prior art bearing of FIG. 1. The bearing pads 8 are spaced such that flow micro-channels 11 are created between the bearing pads 8. The micro-channels 11 provide a path for a fluid to flow for cooling and lubricating the bearing pads 8. As will be appreciated by one skilled in the art, the outer housings (not shown) surrounding and supporting such a bearing may force the cooling/lubricating fluid to flow from an outer diameter 18 of the bearing support ring 15 to an inner diameter 19 as shown in FIG. 2A. Alternatively, the fluid may be forced to flow from the inner diameter to the outer diameter.

The multiple bearing segments 5 are arranged on support ring 15 such that macro-channels 21 are formed between the bearing segments 5 to provide a larger volume of coolant flow through the bearing assembly 4. The macro-channels may be sized, using techniques known in the art, to provide a predetermined pressure differential across the bearing assembly thereby ensuring a fluid flow through the bearing micro-channels sufficient to cool and lubricate the bearing pads 8.

FIG. 2B shows a section through a bearing section A-A of FIG. 2A in which the bearing pads 8 are integral with the bearing segment 5. The bearing surface 9 extends a predetermined distance from the surface 12. In this preferred embodiment, as shown in FIG. 2B, the entire bearing segment 5 is made of a diamond material, such as for example, polycrystalline diamond. The bearing pads 8 may be press formed during the manufacture of bearing segment 5. Alternatively, the bearing pads may be formed by removing material from a formed diamond surface using techniques known in the art. Such techniques include, but are not limited to, electric discharge machining (EDM) and laser ablation techniques. The removal of such material results in the raised pads and the interrelated micro-channels.

The multiple bearing segments 5 are bonded to the bearing ring 15 using any of a number of techniques known in the art. Such bonding techniques include, but are not limited to, brazing, sintering, and diffusion bonding. The bearing ring is commonly a tungsten carbide material. Alternatively, a steel ring may be used.

In one preferred embodiment, the back side of the bearing segment 5 is formed to have a pattern of locking pads 16 extending from back surface 14, see FIG. 2B. The locking pads act to improve the bonding of the bearing segments 5 to the bearing ring 15. The pattern of locking pads 16 may be similar to the pattern of bearing pads 8. Alternatively, the pattern of locking pads 16 may be determined using available numerical modeling techniques such that the pattern of locking pads 16 acts to reduce stress concentrations induced in bearing segment 5 by the compressional loading on bearing pads 8 and the thermal stresses induced by the frictional heating of the bearing pads 8. Such numerical modeling techniques, such as finite element analysis, are known to one skilled in the art and commercial packages are available for performing such an analysis. Such an analysis is application dependent on the size, shape, and loading characteristics of such a bearing system and a locking pad pattern shape may be determined without undue experimentation by one skilled in the art.

The bottom corners 20 of micro-channels 11, see FIG. 2B, may be formed to reduce stress concentration at the corners. Such corners 20 are commonly formed with a predetermined radius to reduce such stress concentrations. The actual shape may be determined using the analytical modeling techniques described previously. In one preferred embodiment, the corner 20 has a radius substantially equal to half of the width of micro-channel 11.

Figure 2C:
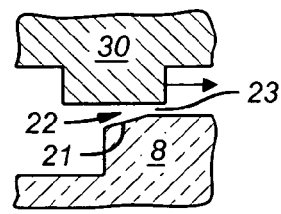
FIG. 2C is a schematic drawing of an interface between moving bearing surfaces according to one embodiment of the present invention.
Figure 3:
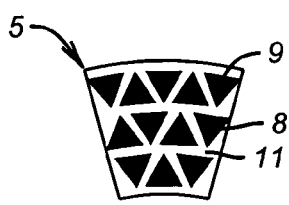
FIG. 3 is a schematic drawing of a diamond bearing segment according to one embodiment of the present invention.

In another preferred embodiment, an upper edge 21 (see FIGS. 2B, 2C) of bearing pad 8 is formed to provide an entrance ramp such that fluid 22 is forced into the interface 23 by the relative motion of mating bearing 30. This action acts to lubricate the bearing and to draw heat away from the bearing surfaces 9. The form of the upper edge 21 may be a chamfer, a radius, or any other suitable shape that provides a wedging action to the fluid 22.

The bearing segments previously discussed with respect to FIGS. 2A, B, C and 3, have bearing pads 8 as an integral part of bearing segment 5. Alternatively, the bearing pads 8 may be individual shaped diamond inserts that are bonded or captured in a metallic matrix bearing ring using techniques known in the art. Commonly, such a metallic matrix is a tungsten carbide material.

Figure 4:
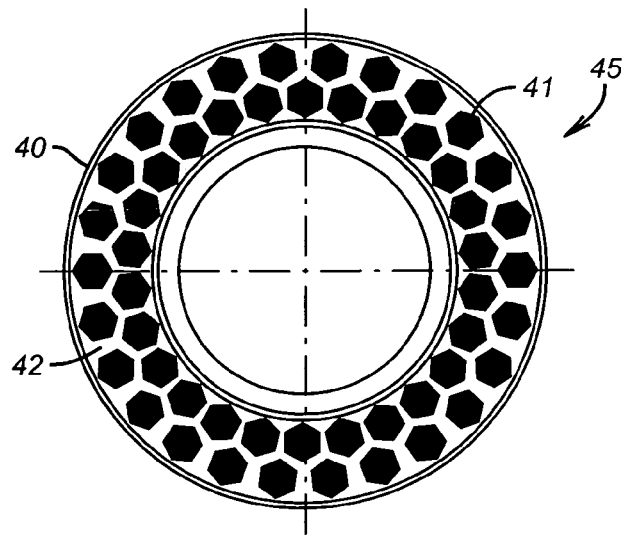
FIG. 4 is a schematic drawing of a diamond bearing according to one embodiment of the present invention.

In one preferred embodiment, see FIG. 4, a diamond bearing 45 is shown with a plurality of hexagonal bearing pads 41 arranged in a concentric pattern on bearing ring 40. Micro-channels 42 are formed between the bearing pads 41. The bearing pads 41 are integral to the bearing ring 40 and are formed using any of the techniques described above.

Figure 5:
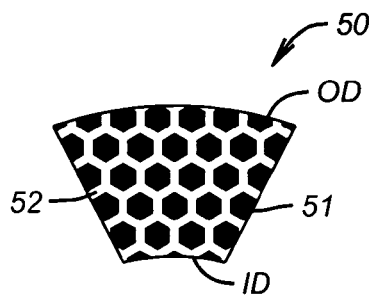
FIG. 5 is a schematic drawing of a diamond bearing segment having a hexagonal pattern of bearing pads according to one embodiment of the present invention.
Figure 6:
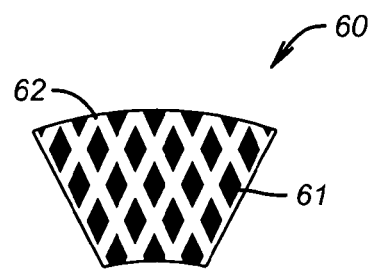
FIG. 6 is a schematic drawing of a diamond bearing segment having a rhomboidal pattern of bearing pads according to one embodiment of the present invention.
Figure 7:
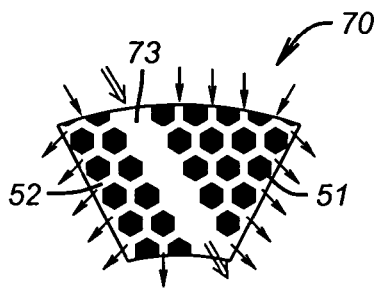
FIG. 7 is a schematic drawing of a diamond bearing segment having a hexagonal pattern of bearing pads and a macro-channel according to one embodiment of the present invention.
Figure 8:
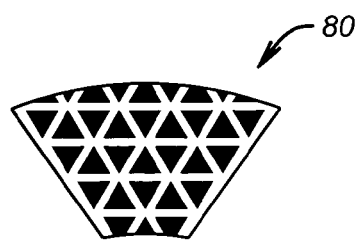
FIG. 8 is a schematic drawing of a diamond bearing segment having a triangular pattern of bearing pads according to one embodiment of the present invention.
Figure 9:
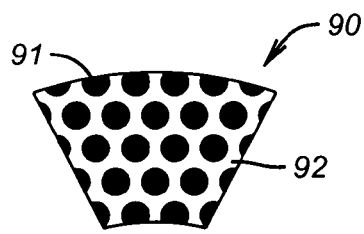
FIG. 9 is a schematic drawing of a diamond bearing segment having a circular or button pattern of bearing pads according to one embodiment of the present invention.

FIGS. 5-9 show other examples of patterns and shapes of diamond bearing segments similar to that shown in FIG. 2. FIG. 5 shows a bearing segment 50 having a hexagonal pattern of bearing pads 51 and flow micro-channels 52. FIG. 6 shows a bearing segment 60 having rhomboidal pattern of bearing pads 61 and flow micro-channels 62. FIG. 7 shows a bearing segment 70 having a hexagonal pattern similar to that of FIG. 5 but with a macro-channel 73 extending across the bearing segment 70 to provide additional fluid flow to the bearing pads 51. FIG. 8 shows a bearing segment 80 having a triangular pattern that is a variation of that shown in FIG. 2. FIG. 9 shows a bearing segment 90 having a spaced pattern of circular, or button, shaped bearing pads 91 and flow micro-channels 92.

Figure 10:
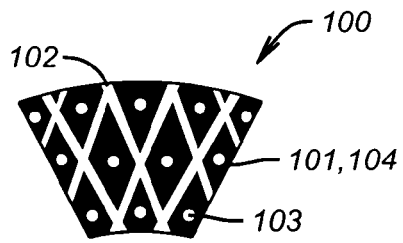
FIG. 10 is a schematic drawing of a diamond bearing segment having a rhomboidal pattern of bearing pads where each pad has a cavity according to one embodiment of the present invention.

FIG. 10 shows a bearing segment 100 having bearing pads 101 and flow micro-channels 102. A cavity 103 is formed in bearing surface 104 of each bearing pad 101. The cavity 103 acts as a fluid reservoir and acts to help provide fluid into the bearing interface 23 (see FIG. 2C) to lubricate and cool the bearing pads 101.

The exemplary bearings described above have bearing pads integrally formed with the bearing segment. Alternatively, the bearing pads may be individual shaped diamond inserts that are bonded or captured in a metallic matrix bearing ring using techniques known in the art. Commonly, such a metallic matrix is a tungsten carbide material.

Figure 11:
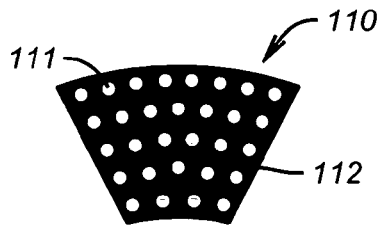
FIG. 11 is a schematic drawing of a diamond bearing segment having a diamond bearing surface with a pattern of fluid holding cavities in the surface according to one embodiment of the present invention.
Figure 12:
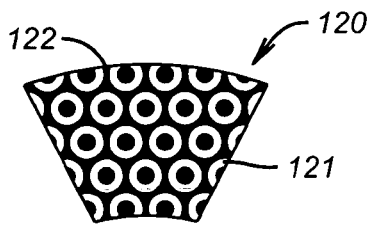
FIG. 12 is a schematic drawing of a diamond bearing segment having a diamond bearing surface with a pattern of annular fluid holding cavities in the surface according to one embodiment of the present invention.

FIG. 11 shows a diamond segment 110 having a continuous diamond surface 112 and a pattern of fluid cavities 111 disposed in the surface 112. The cavities 111 act as fluid reservoirs to lubricate and cool the bearing surface 112. FIG. 12 shows a diamond segment 120 having a continuous diamond surface 122 and a pattern of annular fluid cavities 121 disposed in the surface 122. The cavities 121 act as fluid reservoirs to lubricate and cool the bearing surface 122.

Figure 13:
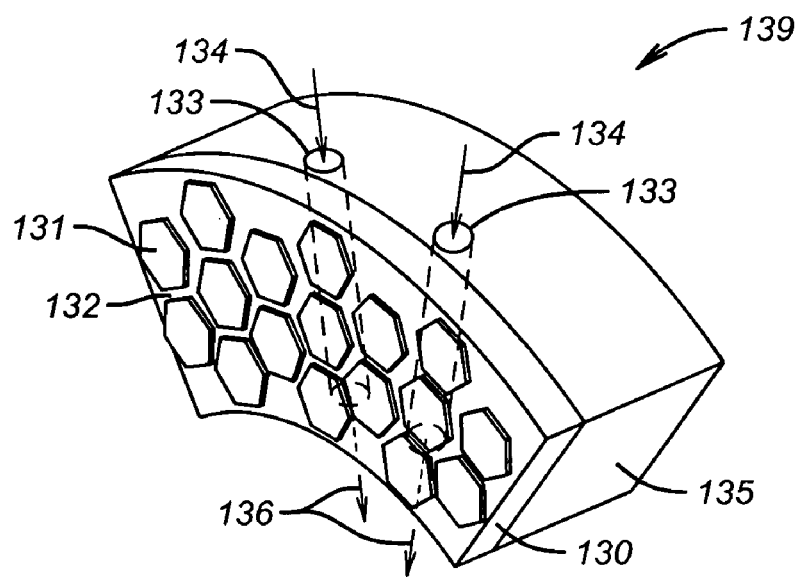
FIG. 13 is a schematic drawing of a diamond bearing assembly having cooling channels located beneath at least one diamond bearing segment according to one embodiment of the present invention.

In another preferred embodiment, FIG. 13 shows a portion of a bearing assembly 139 having bearing segment 130, similar to those described previously Bearing segment 130 has bearing pads 131 and flow micro-channels 132. Bearing segment 130 is bonded to bearing ring 135 that has macro flow channels 133, formed therein, for flowing fluid 134 through the channels 134 and cooling the back side of bearing segment 130. The number and shape of such flow channels 133 may be determined, without undue experimentation, from analytical methods previously described to provide adequate cooling to the bearing pads 131 to prevent degradation.

It will be appreciated by one skilled in the art that all of the exemplary bearing surfaces described herein, have substantially greater bearing surface area than that of prior art bearings.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A diamond bearing assembly, comprising:
   a. a support ring;
   b. at least one diamond bearing segment attached to the support ring;
   c. a plurality of bearing pads disposed on the diamond bearing segment, the plurality of bearing pads having a plurality of flow micro-channels between said bearing pads; and
   d. a flow channel disposed in the support ring proximate the bearing segment, the flow channel having a fluid flowing therethrough for cooling the bearing segment.

2. The diamond bearing assembly of claim 1, wherein the plurality of bearing pads are integral with the bearing segment.

3. The diamond bearing assembly of claim 1, wherein the plurality of bearing pads comprise shaped diamond inserts mounted in the bearing segment.

4. The diamond bearing assembly of claim 1, wherein the plurality of bearing pads are formed into said bearing segment by a pressing operation.

5. The diamond bearing assembly of claim 1, wherein the plurality of bearing pads are hexagonally shaped.

6. The diamond bearing assembly of claim 1, wherein the plurality of bearing pads are formed into said bearing segment by at least one of (i) electric discharge machining and (ii) laser ablation operation.

* * * * *